Figure 1:
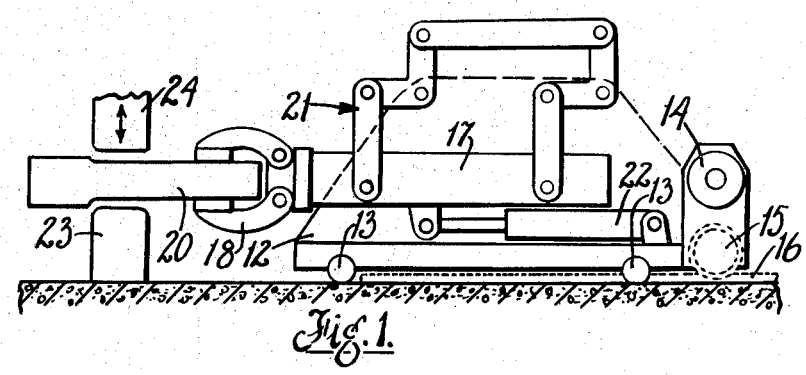

United States Patent
Harrison

[15] 3,696,651
[45] Oct. 10, 1972

[54] FORGING MANIPULATOR
[72] Inventor: Robert Henry Harrison, Sheffield, England
[73] Assignee: Davy and United Engineering Company Limited, Sheffield, England
[22] Filed: April 9, 1971
[21] Appl. No.: 132,719

[30] Foreign Application Priority Data
April 30, 1970 Great Britain..........20,761/70

[52] U.S. Cl.......................................72/22, 72/420
[51] Int. Cl..............................B21j 7/26, B21j 13/10
[58] Field of Search..................72/419, 420, 421, 22

[56] References Cited
UNITED STATES PATENTS
3,468,154  9/1969  Hertl..........................72/421

Primary Examiner—Richard J. Herbst
Assistant Examiner—R. M. Rogers
Attorney—Holcombe, Wetherill & Brisebois

[57] ABSTRACT

A manipulator for supporting and maneuvering a workpiece while operated on by a forging press has a carriage which moves along a prescribed path, means for driving the carriage along the path, a peel which supports the workpiece and which is mounted on the carriage for movement relative to the carriage in a direction parallel to the path, and actuating means for driving the peel relative to the carriage. During at least part of the time when the workpiece is held by the forge, the carriage is caused to move along the path, the peel being caused to move relative to the carriage in the opposite direction and at substantially the same speed. On release of the workpiece by the forging press, the peel is driven by the actuating means in order to be restored to a datum position relative to the carriage. During this re-positioning movement of the peel, there is applied to the carriage a force in the same direction as, and substantially the same magnitude as, the force applied by the peel by the actuating means, in order that the movement of the carriage shall be unaffected by the reaction force applied in the opposite direction by the actuating means to the carriage.

7 Claims, 2 Drawing Figures

PATENTED OCT 10 1972　　　　　　　　　　　　　　3,696,651

FORGING MANIPULATOR

This invention relates to forging manipulators. A forging manipulator is a vehicle for supporting and manipulating a workpiece during a forging operation on the workpiece. The vehicle normally consists of a carriage, which may be rail-bound, carrying a peel which has a pair of jaws for gripping the workpiece end. The peel can be moved relative to the carriage in the longitudinal direction, i.e., parallel to the movement of the carriage, vertically and rotationally.

The forging is effected in a series of squeezes of the forging press, the workpiece being moved longitudinally after each squeeze, or series of squeezes, to present a different part of the workpiece to the forging tools. While the workpiece is held by the forging tools, the peel must be held stationary in the longitudinal direction; on release by the tools, the workpiece must be accelerated longitudinally to take up the new position before the press tools reclose on the workpiece.

If the carriage is also held stationary in the longitudinal direction during the squeeze and is accelerated on release of the workpiece to move the workpiece through the required bite distance, a large motor is required to accelerate the carriage, peel and workpiece sufficiently quickly to cause the workpiece to travel through the bite distance in the limited period of time available. It has therefore been proposed to arrange for the carriage to move continuously in the longitudinal direction and to cause the peel, during the grip time, to move relative to the carriage so that it is stationary in space. On release of the workpiece by the tools, the peel and workpeice, which have a considerably smaller mass than that of the combined carriage, peel and workpiece, are accelerated in the same direction as the carriage movement and at a speed greater than the carriage speed, so that the peel achieves a datum position relative to the carriage, before the tools reclose on the workpiece.

It has also been suggested in out British Patent application No. 42219/70, to drive the carriage discontinuously, the movement being initiated before the peel is released by the press; on release, the peel is moved at a higher speed to achieve the datum position relative to the carriage, before the tools reclose.

The peel is normally driven relative to the carriage by a piston and cylinder unit, which, during the grip time, is allowed to float relative to the carriage, i.e., the two ends of the cylinder are hydraulically connected together to permit free flow of oil from one side of the piston to the other. This has the disadvantage that, when the cylinder is so connected, the peel is effectively out of control and the required registration of the peel in relation to the carriage may be lost.

For "recoil," when the peel is accelerated to restore it to a datum position relative to the carriage, on the release of the workpiece liquid is supplied under pressure to the appropriate end of the cylinder. However, the resulting accelerating of the peel produces a reaction tending to slow the carriage, which may result in the carriage being unable to move through the required distance in the workpiece release time.

According to the present invention, a forging manipulator comprises a carriage movable along a prescribed path, means for driving the carriage along that path, power means for the drive means, a peel for supporting a workpiece mounted on the carriage for movement relative to the carriage in a direction parallel to the path of the carriage, actuating means for driving the peel relative to the carriage, and means, independent of the power means and operative with the actuating means for applying to the carriage a force in the same direction as, and of substantially the same magnitude as, the force applied to the peel by the actuating means. The force applied in this way to the carriage counteracts the reaction on the carriage of the force applied to the peel and ensures that the required carriage speed, dictated by the power means, is not substantially affected.

Preferably the drive means and the actuating means are hydraulic and the power means constituted by a first supply of liquid under pressure. Then a second supply of liquid under pressure may be connected to the drive means and actuating means to apply the substantially equal forces.

There may be additional means, to be effective when the peel is stationary, for connecting the drive means and the actuating means in series with the first supply to cause substantially equal and opposite movements of the carriage and of the peel relative to the carriage.

Figure 2:
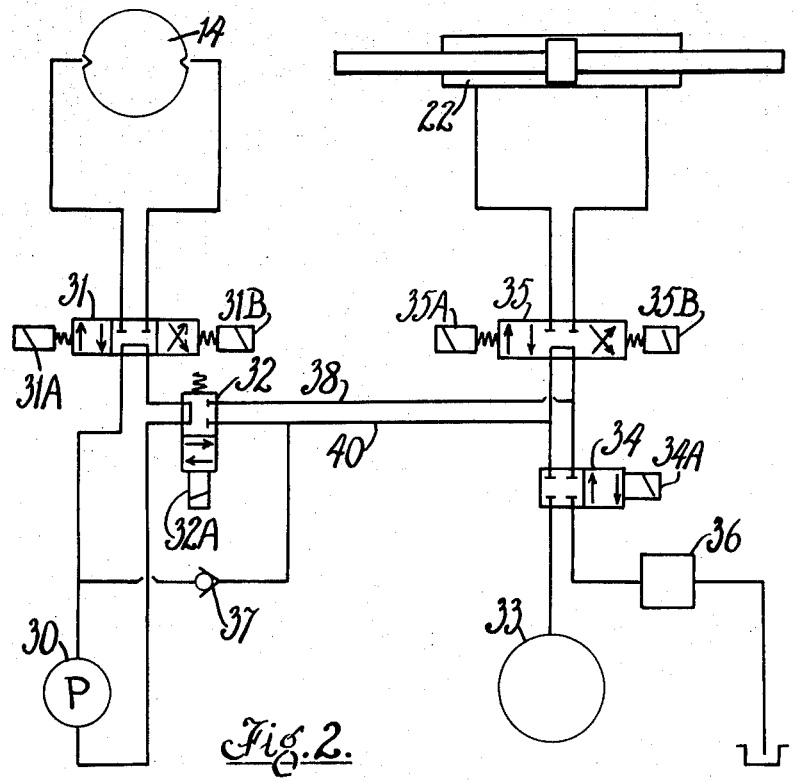

The invention will be more readily understood by way of example from the following description of a forging manipulator and hydraulic drive therefor, reference being made to the drawing accompanying the provisional specification, in which FIG. 1 is a schematic drawing showing the manipulator and forge, and FIG. 2 shows the hydraulic drive circuit for the manipulator.

Referring first to FIG. 1, the carriage 12 of the manipulator is mounted on wheels 13 running on rails (not shown). The carriage carries a hydraulic drive motor 14 driving a pinion 15 meshing with a rack 16 which is located on the floor.

The carriage 12 also supports a peel 17 having a pair of jaws 18 which grip an end of a workpiece indicated at 20. The peel is supported by a linkage 21 and can be driven in the longitudinal direction, i.e., parallel to the carriage movement on the rails, by actuating means in the form of a piston and cylinder unit 22, of which the cylinder is shown as secured to the carriage and the piston to the peel.

The manipulator is shown working in conjunction with a forging press represented schematically by a fixed lower tool 23 and an upper reciprocating tool 24. The carriage is caused to move away from the forging press continually by the motor 14. Each time the press tool 24 descends and grips the workpiece 20, the peel 17 moves relative to the carriage to maintain the peel stationary in space. On subsequent release of the workpiece, the peel 17 is accelerated to the right in FIG. 1, to return to a datum position prior to the next descent of the tool 24.

The hydraulic circuit for the hydraulic motor 14 and the peel piston and cylinder unit 22 is shown in FIG. 2. The motor 14 is supplied normally from a variable delivery pump 30 through a direction valve 31, which can be operated in either direction from the neutral position shown by the solenoids 31A, 31B, and through a second valve 32, which is shown in the de-energized condition but which can be actuated to the energized position by the solenoid 32A.

The unit 22 has its own hydraulic power source 33 which is connected through a recoil valve 34 having its solenoid 34A and through a directional valve 35 which is similar to valve 31 and the solenoids 35A, 35B of which are actuated in series with the corresponding solenoids of valve 31. When valves 34, 35 are in energized condition liquid is supplied to the appropriate end of the cylinder of 22 causing movement of the piston therein, and the liquid driven out of the other cylinder end passes through a flow control valve 36 to vent. Valve 36 sets the maximum peel speed relative to the carriage. Lines 38, 40 connect the lines between valves 34 and 35 to the valve 32. A unidirectional check valve 37 is connected between the supply line from pump 30 and the line 40.

The operation of the manipulator is then as follows:

Solenoids 31A, 35A or 31B, 35B, are energized according to the required direction of movement of the carriage. During the grip time, when the workpiece 20 is held by the tools 23, 24, valve 32 is energized and valve 34 remains de-energized. In this condition, the two hydraulic actuators — the motor 14 and the unit 22 — are connected in series with the pump 30. Liquid is passed from the pump 30, through valve 31, the motor 14, the energized valve 32, line 38, and the valve 35 to one or other end of the cylinder of unit 22, according to the direction of movement. Movement of the piston in the cylinder drives out liquid from the other end of the cylinder which passes through line 40 and valve 32 back to pump 30. Valve 37 remains closed because the pressure of the delivery side of pump 30 is greater than that in line 40.

The hydraulic connections are such that the piston of unit 22 is caused to move in the direction opposite to the direction in which the carriage 12 is driven by the motor 14. Also, the effective dimensions of the unit 22 and the motor 14 are chosen so that the volumetric displacement of the motor 14 per unit length of travel is equal to the area of the peel cylinder, with the result that the net velocity of the peel is zero.

During the forging operation, elongation of the workpiece 20 takes place, and as a result the peel 17 is required to move slightly in the same direction as the carriage movement i.e., away from the press. This movement can be absorbed in the flexibility of the hydraulic circuit for the unit 22. However, the peel may be driven in the required direction, and while the units 14, 22 are connected in series with the pump 30, by arranging for the cylinder of unit 22 to have different areas at each end. As a result, the peel will have a velocity which differs slightly from the velocity given to the carriage 12, and differing from it by the required elongation speed.

On release of the workpiece 20 by the tools 23, 24, valve 32 is de-energized, while valve 34 is energized. In this condition, the pump 30 is connected to the motor 14 only as shown, and continues to drive it. The energization of valve 34 connects the source 33 through the valve 35 to the appropriate side of the cylinder of unit 22 to drive the peel in the same direction as the direction at which the carriage is driven, the liquid discharged from the other end of unit 22 passing through flow control valve 36 to vent. In addition, liquid is passed from source 33 to the motor 14, in parallel to the unit 22, the liquid passing through line 40 and check valve 37 to the feed line for motor 14. As both actuators 14, 22 have equal effective areas and are supplied at equal pressure from the source 33, equal forces are produced on the carriage and peel with the result that the reaction that the peel acceleration would otherwise have on the carriage is completely counteracted, the carriage maintaining the constant velocity determined by pump 30, regardless of the acceleration of the peel.

The operation of the valves 32, 34 may be affected automatically under control of the press, the valve 32 being energized and valve 34 de-energized when the workpiece is gripped by the tools 23, 24 and valve 32 being de-energized and valve 34 energized on release of the workpiece by the tools.

I claim:

1. In a forging manipulator comprising
   a carriage movable along a prescribed path,
   means for driving said carriage along said path,
   power means for the drive means,
   a peel for supporting a workpiece, mounted on said carriage for movement relative to said carriage in a direction parallel to said path, and
   actuating means for driving said peel relative to said carriage,
   the improvement comprising
   means, independent of said power means, and operative with said actuating means, for applying to said carriage a force in the same direction as, and of substantially the same magnitude as, the force applied to said peel by said actuating means.

2. In a forging manipulator comprising
   a carriage movable along a prescribed path,
   hydraulic drive means for driving said carriage along said path,
   a first supply of liquid connectable to said drive means,
   a peel for supporting a workpiece, mounted on said carriage for movement relative to said carriage in a direction parallel to said path,
   hydraulic actuating means for driving said peel relative to said carriage, and
   a second supply of liquid under pressure,
   the improvement comprising,
   means, effective on release of the workpiece by the press, for connecting said second supply to both said drive means and said actuating means, to apply forces to said carriage and to said peel in the same direction.

3. A forging manipulator as claimed in claim 2 in which said connecting means connect said second supply to said drive means and actuating means in parallel.

4. A forging manipulator as claimed in claim 3 in which connecting means include a unidirectional valve between said second supply and said drive means.

5. A forging manipulator as claimed in claim 2, comprising also
   additional means, to be effective while the peel is held stationary, for connecting the drive means and the actuating means in series with the first supply to cause substantially equal and opposite movements of the carriage and of the peel relative to the carriage.

6. A forging manipulator as claimed in claim 5 in which the additional means comprises a valve, in a line between the first supply and the drive means, the valve being arranged to connect the drive means to the first supply either directly or via the actuating means.

7. A forging manipulator as claimed in claim 2 in which the drive means is a hydraulic motor and the actuating means comprise at least one piston and cylinder assembly mounted between the carriage and the peel.

* * * * *

Disclaimer 3,696,651.—*Robert Henry Harrison*, Sheffield, England. FORGING MANIPULATOR. Patent dated Oct. 10, 1972. Disclaimer filed Mar. 17, 1976, by the assignee, *Davy-Loewy Limited*.

Hereby enters this disclaimer to claim 1 of said patent.

[*Official Gazette May 4, 1976.*]